US006079032A

United States Patent [19]
Peri

[11] Patent Number: 6,079,032
[45] Date of Patent: Jun. 20, 2000

[54] PERFORMANCE ANALYSIS OF COMPUTER SYSTEMS

[75] Inventor: Ramesh V. Peri, Allentown, Pa.

[73] Assignee: Lucent Technologies, Inc., Murray Hill, N.J.

[21] Appl. No.: 09/081,879

[22] Filed: May 19, 1998

[51] Int. Cl.[7] ............................................. G06F 11/00
[52] U.S. Cl. ................................................. 714/38; 395/704
[58] Field of Search ................................ 714/38, 21, 25, 714/31, 33, 35, 37, 39, 47; 395/500.05, 575, 704, 701, 502, 507; 711/209, 211

[56] References Cited

U.S. PATENT DOCUMENTS

| | | | |
|---|---|---|---|
| 4,590,550 | 5/1986 | Eilert et al. | 364/200 |
| 4,821,178 | 4/1989 | Levin et al. | 364/200 |
| 5,465,258 | 11/1995 | Adams | 395/700 |
| 5,506,955 | 4/1996 | Chen et al. | 395/183.02 |
| 5,537,541 | 7/1996 | Wibecan | 395/183.21 |
| 5,539,907 | 7/1996 | Srivastava et al. | 395/700 |
| 5,564,015 | 10/1996 | Bunnell | 395/184.01 |
| 5,572,672 | 11/1996 | Dewitt et al. | 395/184.01 |
| 5,608,866 | 3/1997 | Horikawa | 395/183.15 |
| 5,710,724 | 1/1998 | Burrows | 364/551.01 |
| 5,768,152 | 6/1998 | Battaline et al. | 364/551.01 |
| 5,774,724 | 6/1998 | Heisch | 395/704 |
| 5,862,381 | 1/1999 | Advani et al. | 395/704 |
| 5,875,119 | 2/1999 | Bauman et al. | 364/551.01 |
| 6,002,872 | 12/1999 | Alexander, III et al. | 395/704 |
| 6,009,514 | 12/1999 | Henzinger et al. | 712/236 |

*Primary Examiner*—Nadeem Iqbal
*Attorney, Agent, or Firm*—Ratner & Prestia

[57] ABSTRACT

A method of analyzing performance of a program executing in a computer system. A user provides a set of user defined region of the program. Thus, a user has the flexibility to choose the regions of program code profiled. The performance of user defined regions of the program is measured by a set of run-time metrics. Each user defined region is associated with a range break point. Run-time metrics measuring the performance of user defined regions of the program are updated, during execution, whenever a range break point is set. The handling of range break points may be implemented, for example, by specialized hardware and software. This method may be less intrusive than instrumentation based profiling but more accurate than sampling based profiling.

14 Claims, 7 Drawing Sheets

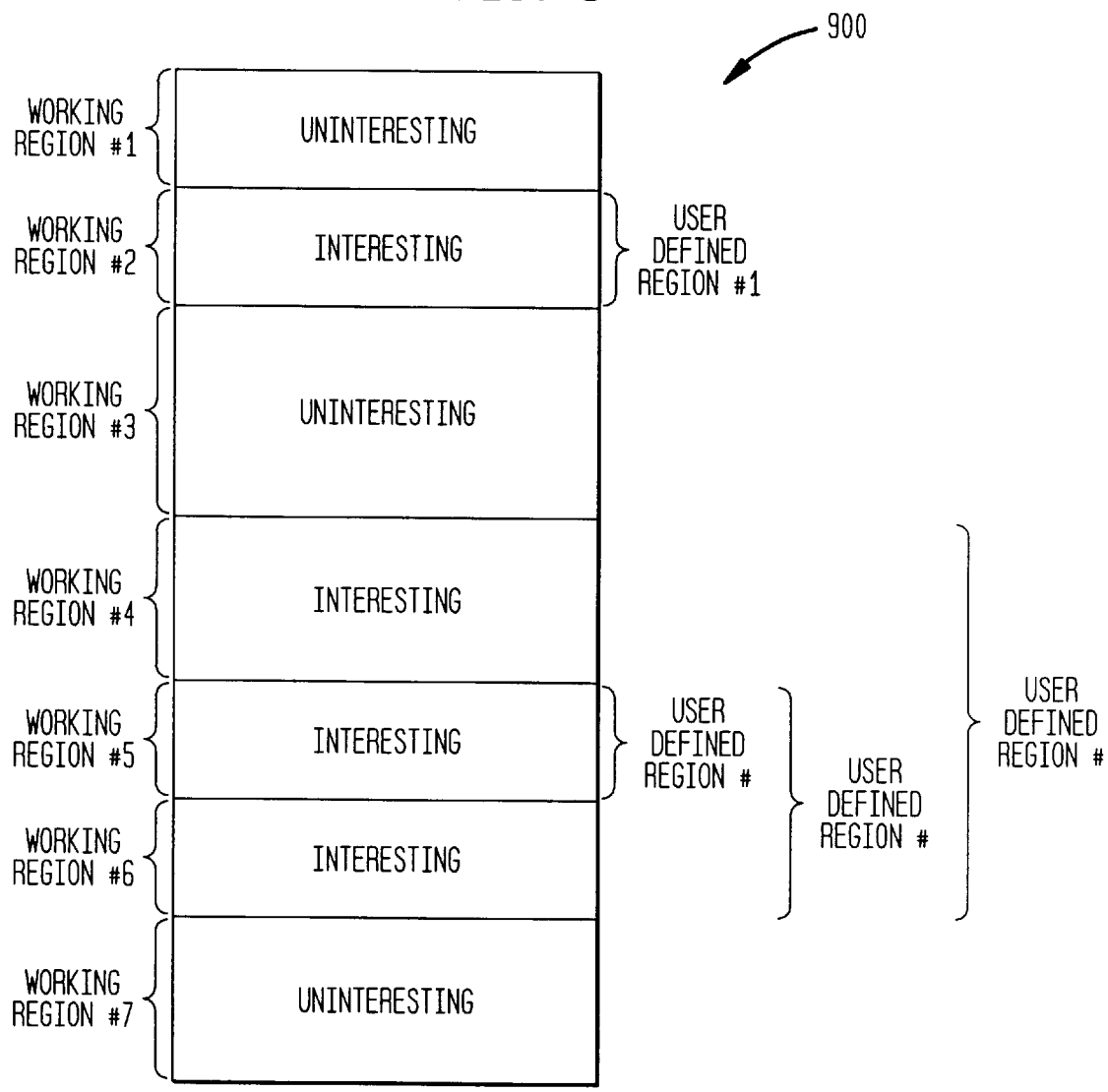

PERFORMANCE ANALYSIS OF COMPUTER SYSTEMS

TECHNICAL FIELD

The present invention relates to the monitoring or profiling and analysis of the performance of computer systems.

BACKGROUND OF THE INVENTION

Performance monitoring or profiling and analysis of computer systems is an important tool both for hardware and software engineering. In order to evaluate existing and new computer architectures it may be useful to collect data related to the performance of the computer system. A variety of information may be collected by a monitoring or profiling tool, for example: cache misses, number of instructions executed, number of cycles executed, amount of CPU time devoted to a user, and the number of instructions that are used to optimize a program, to name just a few.

Different designs of computer hardware structures, such as a computer memory or cache, may exhibit significantly different behavior when running the same set of programs. A monitoring or profiling tool may be useful in identifying design strengths or flaws. Conclusions drawn from the data collected by the profiling tool may then be used to affirm or modify a design as part of a design cycle for a computer structure. Identifying certain design modification, flaws in particular, before a design is finalized may improve the cost effectiveness the design cycle.

Software engineers and programmers can utilize a profiling tool to identify regions in the software that are critical to performance. The need to identify critical regions applies to many types of application programs as well as operating systems. Compiler designers, for example, may wish to know how a compiler schedules instructions for execution, or how well execution conditional branches are predicted. Information about such performance criteria may in turn be used for optimization of the compilation process.

Two common conventional techniques for collecting runtime information about programs executed on a computer processor are instrumentation based profiling and sampling based profiling. Profiling information obtained with these techniques is typically utilized to optimize programs. Conclusions may be drawn about critical regions and constructs of the program by discovering, for example, what portion of the execution time, of the whole program, is spent executing which program construct.

The method of instrumentation based profiling involves the insertion of instructions or code into an existing program. The extraneous instructions or code are inserted at critical points. Critical points of the existing program may be, for example, function entries and exits or the like. The inserted code handles the collection and storage of the desired runtime information associated with critical regions of the program. It should be noted that at runtime the inserted code becomes integral to the program. Once all the information is collected the stored results may be displayed either as text or in graphical form. Examples of instrumentation based profiling tools are prof, for UNIX operating systems, pixie for Silicon Graphics (SGI) computers, CXpa for Hewlett-Packard (HP) computers, and ATOM for Digital Equipment Corporation (DEC) computers.

The method of sampling based profiling involves sampling the program counter of a processor at regular time intervals. For example, a timer is set up to generate an interrupt signal at the proper time intervals. The time duration between samples is associated with a time duration spent executing the program construct, of the code profiled, that the program counter is pointing at. A program construct may be, for example, a function, a loop, a line of code or the like. Data relating time durations with program constructs provides a statistical approximation of the time spent in different regions of the program. Examples of sampling based profiling tools are gprof by GNU, Visual C++Profiler and Perfmon, by Microsoft, and Vtune by Intel.

The difficulty with conventional profiling techniques are that many are intrusive, inflexible, and inaccurate. A difficulty that is common to all profiling techniques is that the very operations themselves involved in collecting and storing information about a running program change the runtime characteristics of that program. Therefore, it is appropriate to optimize the process of collecting and storing information such that the effect on the measurements of program performance is minimized.

Instrumentation based profiling is in general more accurate than sampling based profiling since it accurately identifies and captures various operating characteristics of program constructs. Instrumentation based profiling is, however, more intrusive as extraneous code must be inserted in all regions of interest in the program. Thus, instrumentation based profiling changes the very nature of the program to be monitored. Moreover, a program must be prepared, by the insertion of the extraneous code, during the compilation process. This causes the profiling operation to be inflexible, as any change in the desired information or in the regions of the program to be profiled may require recompilation. In particular, recompilation of large programs may result in substantial time costs.

Sampling based profiling is less intrusive but also less accurate than instrumentation based profiling. Sampling based profiling provides a statistical approximation of the information collected. Hence, sampling based profiling may be sensitive to a set of assumptions and inaccuracies involved in approximation. For example, sampling based profiling relies on the assumption that inter-sample time durations are related to a particular program construct identified at the sampling instant. It is possible, however, that the sampling instant is such that the inter-sample time duration bears no relationship to the program construct identified. Such inaccurate information adds noise to the statistical approximation. Further, sampling based profiling is less flexible than instrumentation based profiling. The technique is difficult to use for monitoring the behavior of program constructs that are smaller than functions, as it is difficult to accurately associate the value of the program counter with a particular region of the program. Increasing the sampling rate may improve the accuracy and flexibility of sampling based profiling but then the technique becomes intrusive.

SUMMARY OF THE INVENTION

A method and system of analyzing performance of a program, executing in a computer system. The performance of the program executing in the computer system is measured based on a plurality of run-time metrics. A plurality of user defined regions of the program are provided. A plurality of range break points are set, while the program is executing. Each range break point is associated with at least one of the plurality of user defined regions. During execution of the program the plurality of run-time metrics are updated whenever one of the plurality of range break points is set. The plurality of run-time metrics are reported to a user.

BRIEF DESCRIPTION OF THE DRAWING

FIG. 9 is a diagram that is helpful in understanding a partitioning of a program into working regions by dividing overlapping user defined regions.

DETAILED DESCRIPTION OF THE INVENTION

Figure 1:
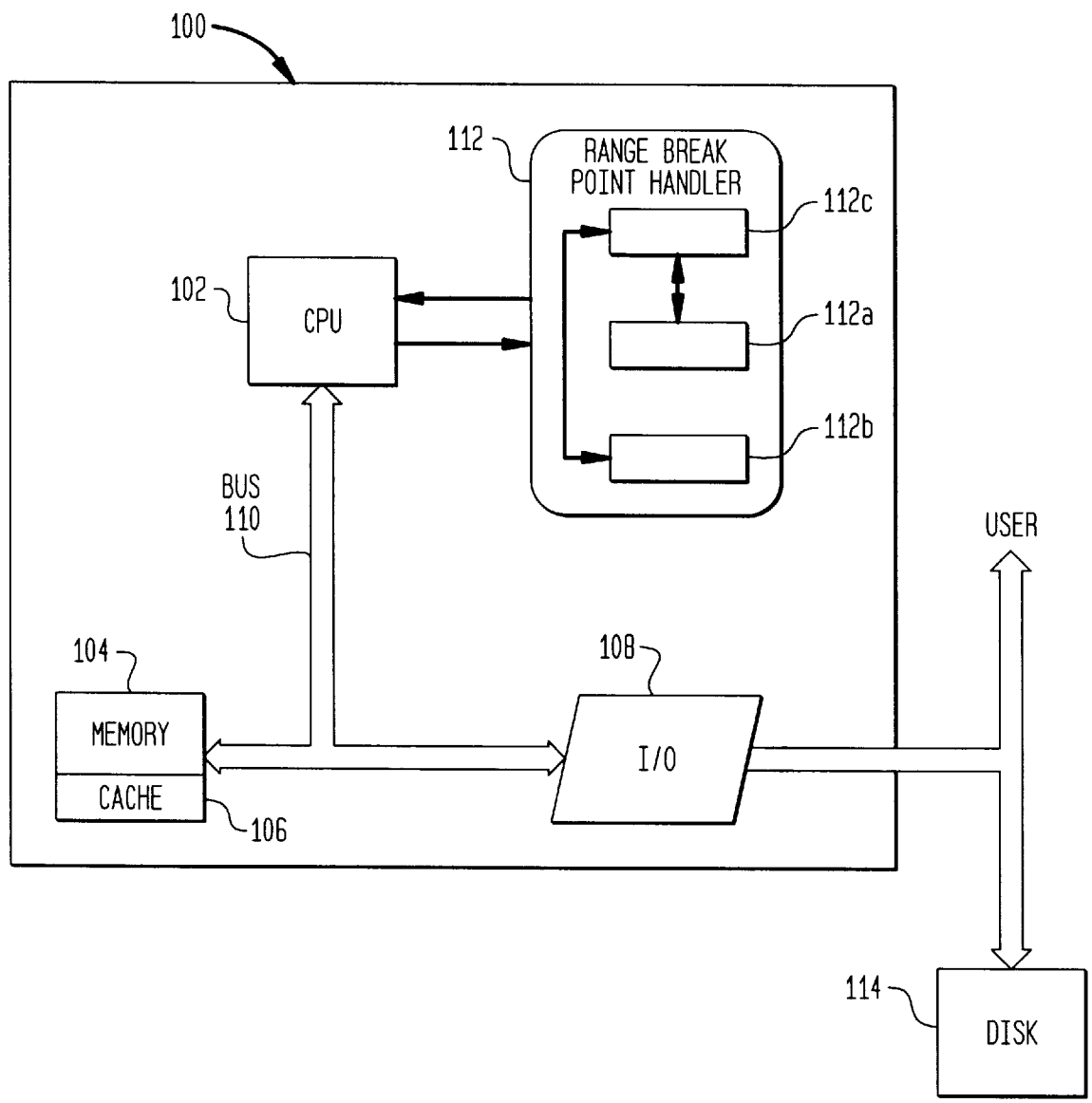
FIG. 1 is a block diagram of a computer system that may be profiled in accordance with the present invention.

FIG. 1 is a block diagram of a computer system 100 that may be profiled in accordance with the present invention. Computer system 100 shown in FIG. 1 includes a central processing unit (CPU) 102, a memory 104 with a cache 106, an input/output interface (I/O) 108, a bus 110, a range break point handler 112, and a disk 114. The CPU 102, memory 104, and the I/O interface are coupled to each other by the communications bus 110. The cache 106 is included in the memory 104 to improve the data flow between the CPU 102 and the memory 104. The I/O interface 108 includes input and output interfaces for a acquiring and distributing data to, for example, a disk 114 or a user. A range break point handler 112 may be included in the CPU 102 or may be implemented separately, is shown in FIG. 1, in hardware, software, or firmware. Range break point handler 112 includes two registers, a starting address register 112a and an ending address register 112b. The starting address register contains starting addresses of a program region to be profiled. The ending address register contains ending addresses of a program region to be profiled. Handler 112 also facilitates the raising of interrupts indicating entries and exits from a region of a program lying within the range between a starting address and an ending address. The functionality of the handler 112, including registers 112a and 112b, may be controlled by a control program 112c. Such facilities for handling range break points are included in processors such as, for example, Lucent Technologies 16210 DSP processor, or the like.

Computer system 100 of FIG. 1 may be, for example, a personal computer, a work-station, a main-frame, or part of a network of computers executing programs independently, or in parallel.

Figure 2:
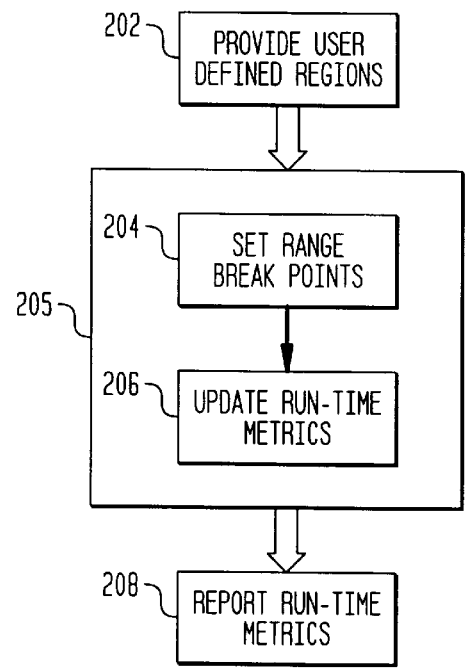
FIG. 2 is a flow chart diagram that is helpful in understanding performance analysis of a program executing in a computer system in accordance with the present invention.

FIG. 2 is a flow chart diagram that is helpful in understanding the analysis of the performance of a program executing in a computer system in accordance with the present invention. First a set of user defined regions of a program are provided in step 202. User defined regions of code may be provided in the form of a set of pairs. Each pair includes a starting address and an ending address. The range of code in a program between the starting, address and the ending address designates a portion or region of the program to be profiled. For example, suppose n user defined regions are provided, each with a starting address and an ending address. The set of n user defined regions may be written $$\{(s_1,e_1),(s_2,e_2),\ldots,(s_n,e_n)\},$$

where $s_i$ is the starting address of the $i^{th}$ region and $e_i$ is the ending address of the $i^{th}$ region and $s_i \leq e_i$. For ease of presentation it is assumed her(in that if i<j then either $(s_i \leq s_j \leq e_j < e_i)$, $(s_i < s_j \leq e_j \leq e_i)$, or $(s_i \leq e_i < s_j \leq e_j)$. In other words, all user defined regions are sorted, and are either non-overlapping or such that one is contained in the other.

In step 204 range break points are set while the program is executing. Step 204 is shown together with step 206, in a box 205. The relationship between the execution of a program and the setting of range break points is difficult to demonstrate in box 205, because range break points are set dynamically during the execution of a program. The range break point may be set to assist in keeping track of a region of code such as a user defined region. A range break point is set whenever, during the execution of a program a central processing unit, having executed the current instruction and loaded the next instruction to execute, exits a region of code defined by a starting address and an ending address. Range break point handler 112 shown in FIG. 1, facilitates the setting of range break points. The starting address and ending address defining a region of code such as a user defined region may be loaded into the registers 112a, 112b, respectively. The range break point handler then sets a range break point by raising an interrupt whenever a region of code such as a user defined region is exited. The control program 112c is executed when an interrupt is raised by the range break point handler.

In step 206 (within box 205) values representing the current state of a set of run-time metrics are updated. Box 205 serves to indicate that the relationship between the execution of a program and updating of run-time, metrics is difficult to demonstrate because run-time metrics are updated dynamically during the execution of a program. Run-time metrics are standards of measurement that may represent a variety of performance criteria related to a program executing in a computer system. During the execution of a program, following an interrupt raised by the range break point handler, the run-time metrics related to the performance of user defined regions in the executing program are updated. Run-time metrics related to the performance of a user defined region may include, for example, the inclusive cycle count, the exclusive cycle count, and the execution count, or the like.

The inclusive cycle count refers to the number to CPU cycles spent executing the region including any CPU cycles spent executing function called from the region, the exclusive cycle count refers to the number of (CPU cycles spent executing the region excluding any CPU cycles spent executing functions called from the region, and the execution count refers to the number of times the region has been executed.

In step 208 the final state of the run-time metrics, having been updated all through the execution of a program, is reported to a user. The performance information contained in the run-time metrics may be reported to a user in the form of text or in graphical form. The performance information contained in the run-time metrics may be used to identify and rectify performance problems associated with regions of code such as user defined regions executing as part of a program in computer system 100.

For example, all the functions in a program may be provided as user defined regions. The user can use exclusive cycle count as a run-time metric in order to identify functions that are "hot". In other words, functions that cost many CPU cycles to execute. The user can then concentrate on optimizing the code associated with these "hot" functions. Optionally, the user can use the execution count to identify functions that are called often during the execution of the program. If function with a high execution count are called from few regions of the program, then the user may consider incorporating the code of the function into the regions from which it is called (inlining). For a function with a high execution count incorporating the code of the function into the (few) regions from which it is called, or inlining, may optimize the program by saving overhead costs associated with function calls. Moreover, it is possible to obtain information about the execution paths of a program by comparing the inclusive cycle count to the exclusive cycle count of a function. A low inclusive cycle count may indicate that a function lies along an infrequent execution path. Functions that do not call other functions will have an inclusive cycle count that is equal to the exclusive cycle count. In general, a function called through one execution path may spent many CPU cycles executing while the same function called through another execution path may spent few CPU cycles executing. Such behavior may manifest in the information contained in the run-time metrics. A comparison of the inclusive cycle counts of callers of a function to the exclusive cycle count of the called function may reveal the ratio of CPU cycles spent executing the function when called by one caller to CPU cycles spent executing the function when called by another caller.

Figure 3:
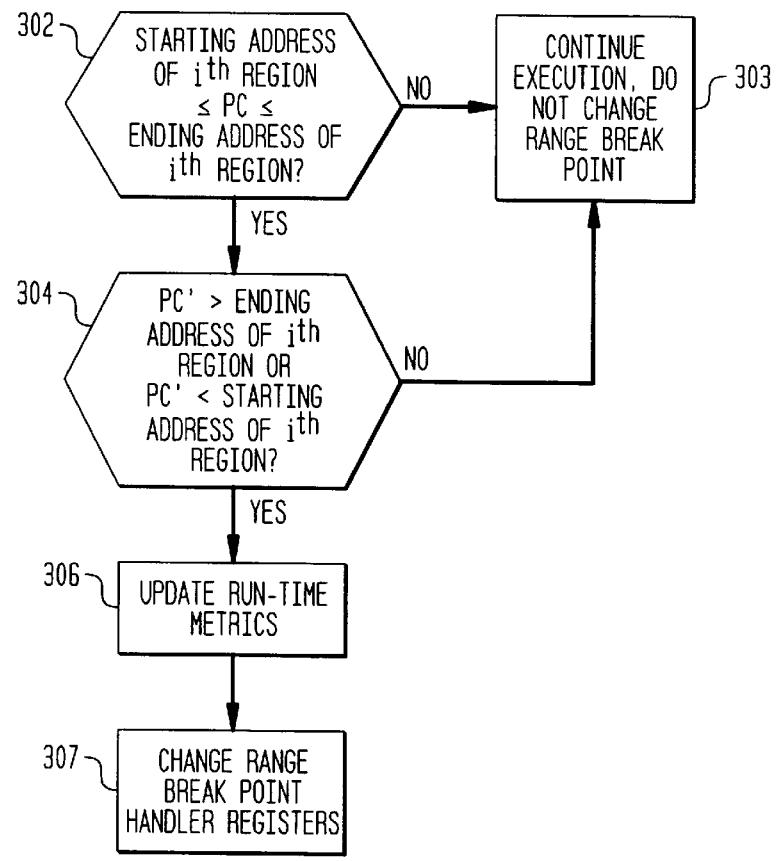
FIG. 3 is a flow chart diagram that is helpful in understanding the correspondence between regions of a program and range break points.

FIG. 3 is a flow chart diagram that is helpful in understanding the correspondence between regions of a program and range break points. Once a starting address and an ending address associated with a region of a program such as a user defined region have been loaded into registers 112a and 112b, the range break point handler 112 sets a range break point by raising an interrupt whenever a region of code such as a user defined region is exited. Range break point handler 112 monitors the value of the program counter, pc, before the current instruction is executed by the CPU 102 and the value of the program counter after the current instruction had been executed, pc'. Range break point handler 112 sets a range break point whenever (starting address $\leq$ pc $\leq$ ending address) and (pc'>ending address or pc'<starting address). In step 302 a comparison is made to determine whether the current instruction belongs to the region of code defined by the starting address and the ending address. If it does not, program execution continues and no range break point is set in step 303. If it does, then in step 304 another comparison is made to determine whether the next instruction to be executed lies outside the range defined by the starting address and the ending address. Further, a search may be performed to determine the region that corresponds to pc'. If the next instruction lies outside the range then run-time metrics are updated for the current region in step 306, and subsequently a range break point is set in step 307. Otherwise, no range break point is set in step 303.

Although the foregoing discussion applies to ore region of code, it is understood that similar methodology applies equally to a range break point handler capable of dealing with multiple regions of code. Hence, a range break point handler may be used to set multiple range break points. For example, starting addresses and ending address for different regions of code may be loaded into a range break point handler during the execution of the program. In other words, as the handler tracks the execution of the program, the appropriate starting and ending addresses corresponding to the current region or regions of code (encompassing the current value of the program counter) may be loaded. This functionality may be implemented, for example, in by the control program 112c of the range break point handler.

Figure 4A:
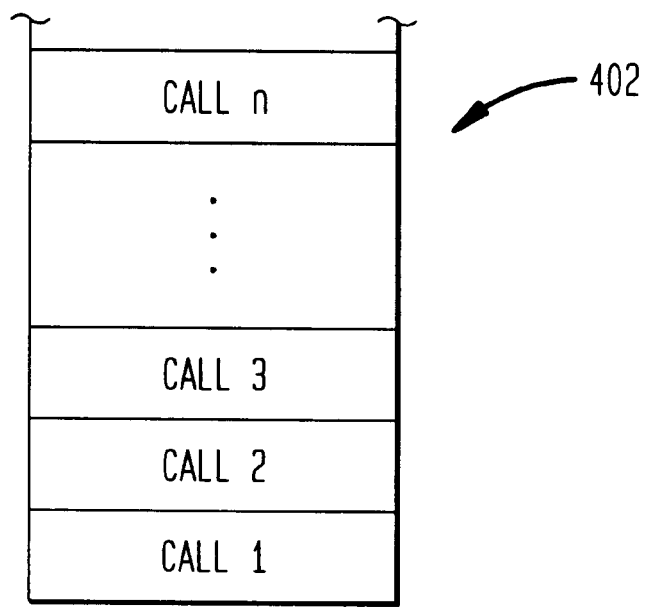
FIG. 4(a) is a diagram illustrating the structure of a run-time stack in accordance with an embodiment of the present invention.

During the execution of the program a run-time stack will contain function calls made by functions in the program that have not yet returned. A diagram illustrating the structure of a run-time stack 402 containing n function calls is shown in FIG. 4(a). Each entry in the run-time stack 402 corresponds to a record of data. The record corresponding to data in the run-time stack 402 may be defined, for example, as follows,

```
struct run-time-stack-entry {
    int cycle-count-register;
    int child-cycle-count;
}.
```

Figure 4B:
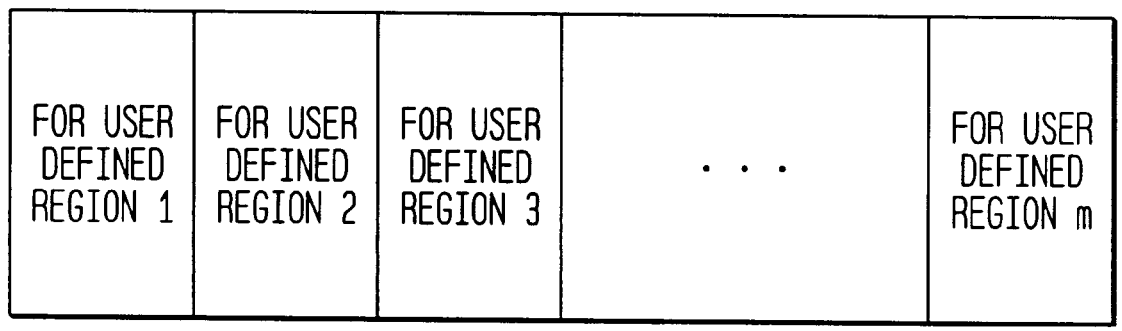
FIG. 4(b) is a diagram illustrating the configuration of a run-time data structure in accordance with an embodiment of the present invention.

Furthermore, during the execution of the program run-time metrics are updated and stored in a run-time data structure. The run-time data structure stores run-time metrics associated with each user defined region of the program. A diagram illustrating the configuration of a run-time data structure 404 for storing run-time metrics for m user defined regions is shown in FIG. 4(b). Each user defined region corresponds to a record of run-time information. These records of run-time information may be defined, for example, as follows,

```
struct run-time-data{
    int inclusive-cycle-count;
    int exclusive-cycle-count;
    int execution-count;
}.
```

The range break point handler 112 sets a break point and raises an interrupt when an instruction being executed exits a user defined region. Run-time metrics may be updated depending on the type of instruction that caused a user defined region to be exited. Instructions that cause a user defined region to be exited include a call instruction, a return instruction, and a goto instruction. For each of these instructions, data may be modified in the run-time stack 402, and run-time metrics may be calculated and stored in the run-time data structure 404.

Figure 5:
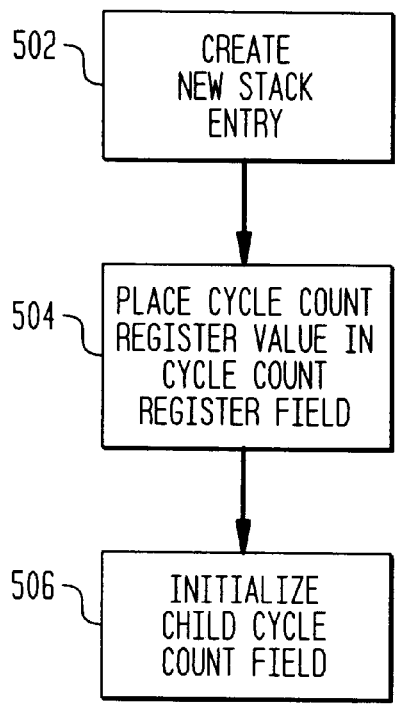
FIG. 5 is a flow chart diagram that is helpful in understanding a sequence of operations prompted by a call instruction in accordance with an embodiment of the present invention.

The execution of a call instruction means that a parent function is calling a child function. For example, in FIG. 4(a) the $n^{th}$ call contained in the stack corresponds to a child function of a parent corresponding to the $(n-1)^{th}$ call. Thus, the run-time stack 402 may be modified so that the run-time metrics associated with both the child and the parent functions may be updated once the present execution of the child function terminates. FIG. 5 shows a sequence of operations performed upon execution of a call instruction. In step 502 a new entry is created at the top of the run-time stack 402. In step 504 the value of the cycle count register of the computer system is placed in the cycle count register field of the new slack entry, and in step 506 the child cycle count field of the new entry is initialized to zero.

Figure 6:
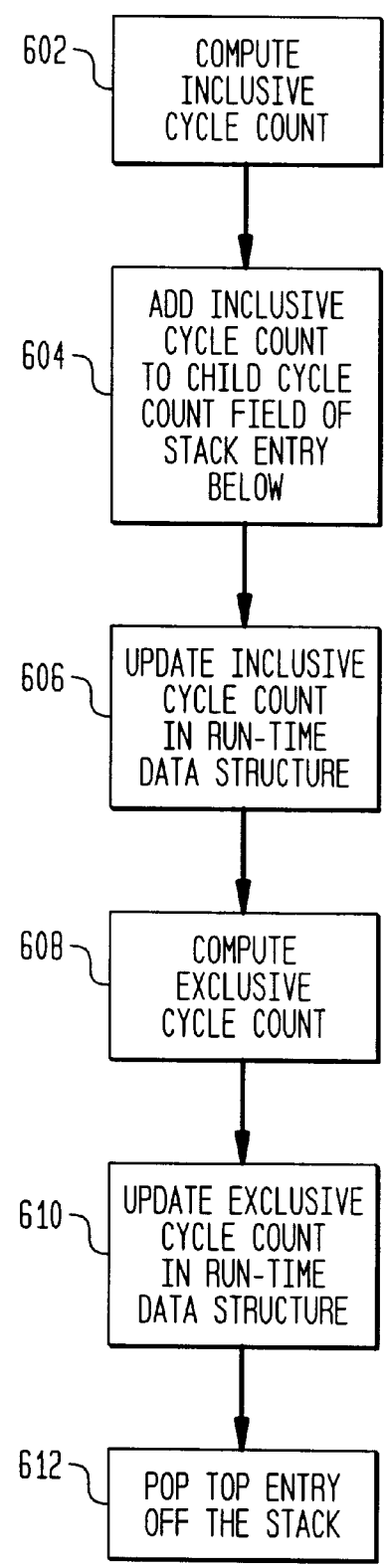
FIG. 6 is a flow chart diagram that is helpful in understanding a sequence of operations prompted by a return instruction in accordance with an embodiment of the present invention.

The execution of a return instruction means that the child function that corresponds to the top entry on the run-time stack 402 has terminated. For example, with respect to FIG. 4(a), the execution of a return instruction means that the child function that corresponds to the $n^{th}$ call has presently terminated execution. FIG. 6 shows a sequence of operations performed upon execution of a return instruction. In step 602 the inclusive cycle count, associated with a user defined region that has been exited, is computed by taking the difference between the current value of the computer system's cycle count register and the value in the cycle count register field of the top stack entry. In step 604 the inclusive cycle count computed in step 602 is added to the value of the child cycle count field of the stack entry below the top entry, i.e. if the top entry is the $n^{th}$ entry, as in FIG. 4(a), the entry below the top entry is the $(n-1)^{th}$ entry. In step 606 the inclusive cycle count computed in step 602 is added to the inclusive cycle count field, associated with the user defined region exited, in the run-time data structure 404. In step 608 the exclusive cycle court, associated with a user defined region that has been exited, is computed by taking the difference between the inclusive cycle count computed in step 602 and the child cycle count. In step 610 the exclusive cycle count computed in step 608 is added to the exclusive cycle count field, associated with the user defined region exited, in the run-time data structure 404. In step 612 the current entry is popped off the run-time stack 402.

Figure 7:
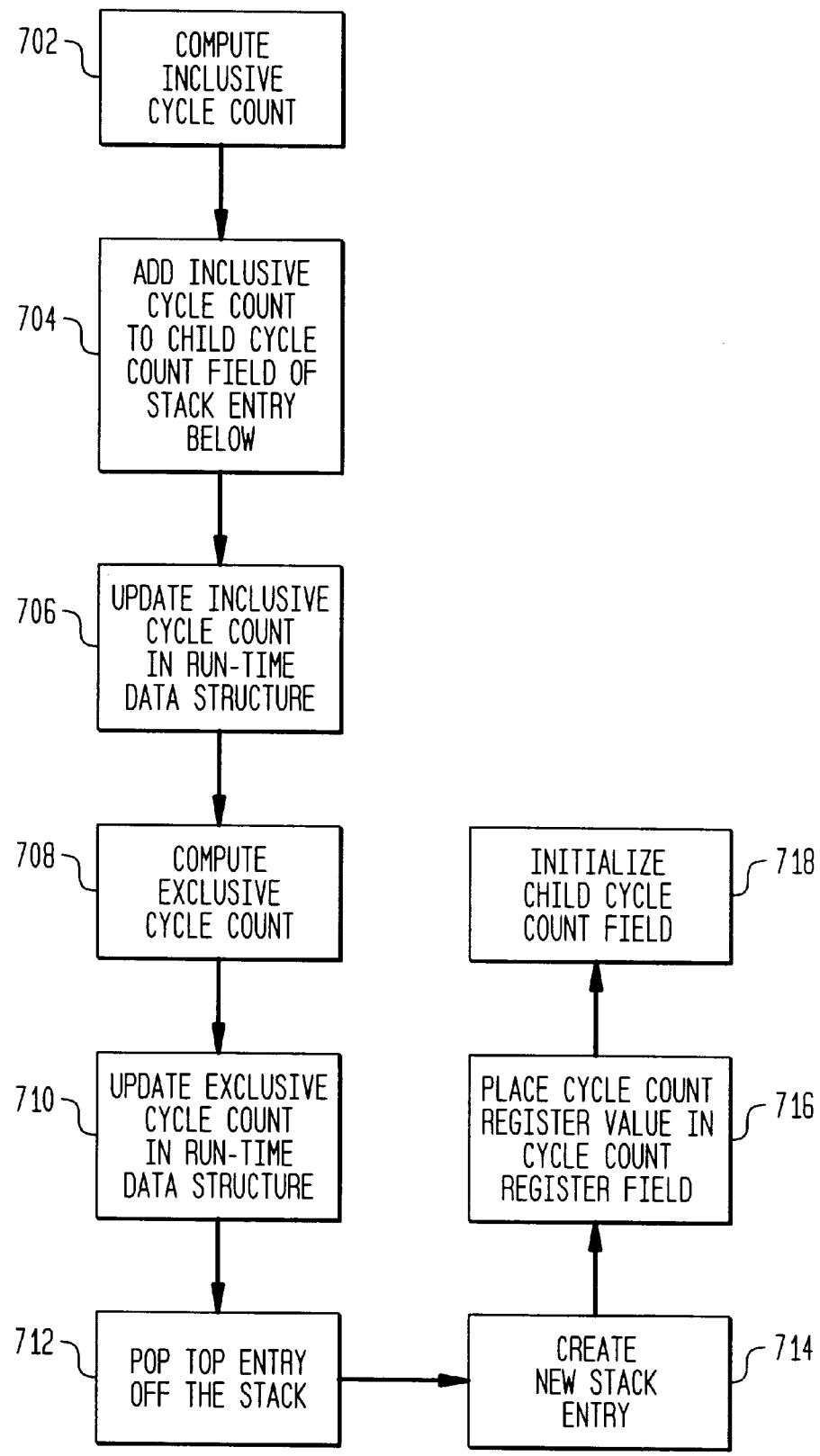
FIG. 7 is a flow chart helpful in understanding a sequence of operations prompted by a goto instruction in accordance with an embodiment of the present invention.

FIG. 7 is a flow chart diagram that is helpful in understanding a sequence of operations prompted by a goto instruction in accordance with an embodiment of the present invention. The operations outlined by steps 702, 704, 706, 708, 710, and 712 are respectively similar to those explained above for steps 602, 604, 606, 608, 610, and 612 of FIG. 6. In addition, if after the execution of a goto instruction a user defined region is entered, then steps 714, 716, and 718 are performed. In step 714 a new entry is created at the top of the run-time stack 402. In step 716 the value of the cycle count register of the computer system is placed in the cycle count register field of the new stack entry, and in step 718 the child cycle count field of the new entry is initialized to zero.

Before the execution of a program in the computer system an entry is pushed onto the run-time stack 402 with the cycle count register field and the child cycle count field set to zero. After termination of a program (execution in the computer system the entry first pushed onto the run-time stack 402, before execution begun, contains the total cycle count for the entire program in the child cycle count field. Moreover, after termination of a program execution in the computer system the run-time metrics associated with the user defined regions are found in the run-time data structure 404.

Figure 8:
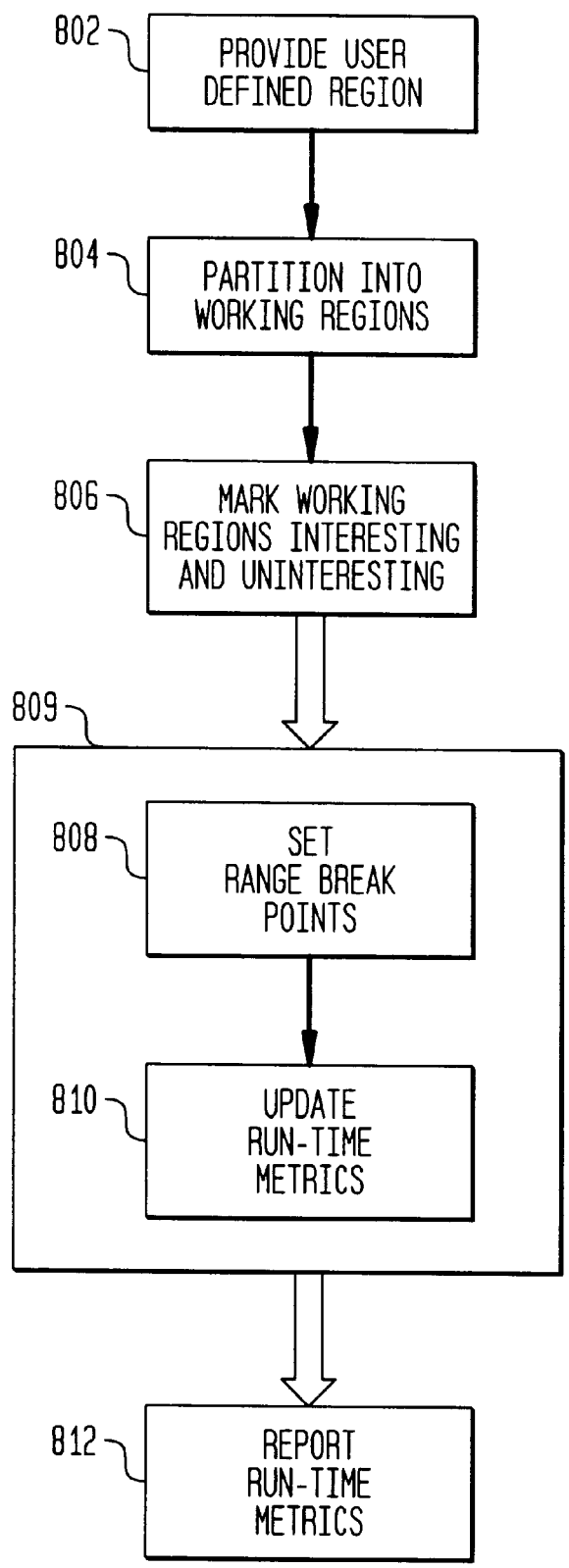
FIG. 8 is a flow chart helpful in understanding the features of a method for analyzing performance of a program executing in a computer system in accordance with an embodiment of the present invention.

FIG. 8 is a flow chart diagram that is helpful in understanding the features of a method for analyzing performance of a program executing in a computer system in accordance with an alternative embodiment of the present invention. First a set of user defined regions of a program are provided in step 802, as described above for step 202 of FIG. 2. In step 804 the entire program is partitioned into working regions. Similarly to user defined regions, working regions may be defined by a starting address and an ending address. For example, suppose the program is partitioned into m working regions each defined with a starting address and an ending address. The set of m user working regions may be written $$\{(s'_1,e'_1),(s'_2,e'_2), \ldots , (s'_m,e'_m)\},$$

where $s'_i$ is the starting address of the $i^{th}$ working region and $e'_i$ is the ending address of the $i^{th}$ working region, and $e'_{i-1}=s'_i-1$ for i=2, . . . ,m. Further, it is assumed for simplicity that all working regions are sorted. In other words, $$i<j \rightarrow (s'_i<s'_j) \text{ and } (e'_i<e'_j).$$

The program is partitioned into working regions such that, $s'_1$ is the starting address of the program and $e'_m$ is the ending address of the program. User defined regions are divided into working regions. Hence, for every user defined region, say $(s_i,e_i)$, there is a $k \geq 1$ such that $$\{(s'_j,e'_j),(s'_{j+1},e'_{j+1}), \ldots ,(s'_k,e'_k)\}$$

is a sequence of working regions and $s_i=s'_j$ and $e_i=e'_k$. Finally, it is supposed that for every two sequential working regions $(s_i',e_i')$ and $(s'_{i+1},e'_{i+1})$ there is a user defined region $(s_j,e_j)$ such that $e_i' \leq s_j \leq S_{i+1}'$ or $e_i' \leq e_j \leq s_{i+1}'$. In other words, the program is partitioned into as small as possible a number of working regions such that user defined regions are divided into non-overlapping working regions. The total number of working regions is kept as small as possible so as to reduce! any potential overhead involved in profiling the program. The overhead involved in profiling may increase with the number of working regions as the range break point handler shall set a range break point by raising an interrupt whenever some working regions are exited.

In step 806 each working region is marked as interesting or as uninteresting. A working region, say $(s'_i,e'_i)$, is marked interesting if it belongs to some user defined region, say $(s_j,e_j)$, i.e. if $s_j \leq s'_i$ and $e'_i \leq e_j$. Otherwise, the working region is marked uninteresting. FIG. 9 shows the partition of a program 900 where four user defined regions have been provided. The program 900 in FIG. 9 is partitioned into seven working regions out of which four are interesting and three are uninteresting.

Step 808 is shown in FIG. 8 enclosed, together with step 810, in a box 809. The operations outlined by these steps are respectively similar to those of steps 204 and 206 of FIG. 2. The enclosing box 809 serves to indicate that the relationship between the execution of a program and the setting of range break points or updating of run-time metrics is difficult to demonstrate in FIG. 8, because range break points are set and run-time metrics are updated dynamically during the execution of a program. During the execution of a program, following an interrupt raised by the range break point handler, the run-time metrics related to the performance of user defined regions in the executing program are updated.

Similarly to the foregoing description, range break point handler 112 sets a break point by raising an interrupt when an instruction being executed exits an interesting working region. Run-time metrics may be updated depending on the type of instruction that caused a user defined region to be exited. Instructions that cause a user defined region to be exited include a call instruction, a return instruction, and a goto instruction. For each of these instructions, data may be modified in the run-time stack 402, and run-time metrics may be calculated and stored in the run-time data structure 404. Similarly to the explanation of the foregoing description, FIG. 5 shows a sequence of operations performed upon execution of a call instruction, FIG. 6 shows a sequence of operations performed upon execution of a return instruction, and FIG. 7 shows a sequence of operations performed upon execution of a goto instructions. In this case, the additional steps 714, 716, and 718 are performed upon execution of a goto instruction, if after the execution of the goto instruction an interesting working region is entered. In step 812 the final state of the run-time metrics, having been updated all through the execution of a program, is reported to a user.

The following is an exemplary utility facilitating interaction between a user and a tool for profiling the performance of a program. The exemplary utility program is called 'stat'. The format for employing 'stat' is as follows:

stat [function<function name>|addr<address>|addr<address:address>|line<line>| line=<line:line>|all functions |all lines]—sets up the user defined regions so that run-time information about these regions may be updated during execution of the program. 'stat' returns the list of stat_id's; where stat_id may be, in turn, used again by 'stat';

stat [on |off ]<stat_id>—changes the state of the stat_id to make it active or inactive;

stat delete <sta_id >—deletes the user defined region identified by stat_id;

stat ?—gives a list of user defined regions of the program and their status, the format is ((stat_id command_string start_addr end_addr status) . . . );

stat data [<stat_id>|all]—outputs the run-time metric information for user defined regions specified by stat_id, the format is ((stat_id exclusive-cycle-count inclusive-cycle-count execution-count) . . . ).

A tool for profiling the performance of a computer program in accordance with the present invention may be implemented, for example, as an enhancement to a product such as, for example, TEEM; a commercial product of Lucent Technologies for developing and debugging programs for embedded processors.

An exemplary interaction between a user and a tool for profiling the performance of a program in accordance with the present invention, and an exemplary pseudo-code program listing follow. The pseudo-code listing is a method for partitioning a program into working regions by dividing the user defined regions provided.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

---

- sort all The numbers $\{s_i\}$ and $\{e_i\}$; i=1,...,n into a single list of length 2n and let the list be $\{A_i\}$
- If ($A_1$ > start-address-of-program) then
    - create a new working region with (start-address-of-program, $A_1$-1)
    - mark the region as Uninteresting
- endif
- new-region-start = $A_1$
- nested-region = 1
- for I = 2 to n
    - if ($A_i$ is the start of a user defined region) then
        - if (new-region-start < = $A_i$ - 1) then
            - create a new region with (new-region-start, $A_i$ - 1)
            - if (nested-region = 0) then
                - mark region as Uninteresting
            - else
                - mark region as Interesting
            - endif
            - new-region-start = $A_i$
        - endif
        - nested-region = nested-region + 1
    - else
        - if (new-region-start < = $A_i$ ) then
            - create a new region with (new-region-start, $A_i$)
            - mark the region as Interesting
            - new-region-start = $A_i$ + 1
        - endif
        - nested-region = nested-region - 1
    - endif

---

> stat function main
(1)
> stat line 3:5
(2)
> stat?
((1 "function main" 100 200 on) (2 "line 3:5" 200 300 on))
> stat off 2
ok
> stat?
((1 "function.main" 100 200 on) (2 "line 3:5" 200 300 off))
> stat on 2
ok
> stat delete 1
ok
> stat?
((2 "line 3:5" 200 300 on))
> stat function main
(3)
> stat?
((2 "line 3:5" 200 300 on) (3 "funcnon main" 100 200 on))
> run
< output of progarn>
> stat data
((2 10 20 3)(3 5 9 3))

- Note that in the above listing the user prompt is shown with '>'.

What is claimed:

1. A method of analyzing performance of a program, executing in a computer system, based on a plurality of run-time metrics, said method comprising the steps of:
   (a) providing a plurality of user defined regions of the program;
   (b) setting a plurality of range break points, while the program is executing, each associated with at least one of the plurality of user defined regions;

(c) updating the plurality of run-time metrics during execution of the program whenever one of the plurality of range break points is set; and (d) reporting the plurality of run-time metrics to a user.

2. The method according to claim 1, wherein the plurality of run-time metrics include an inclusive cycle count, an exclusive cycle count, and an execution count.

3. The method according to claim 1, wherein step (c) further comprises the steps of:

modifying data in a run-time stack whenever one of the group consisting of a call instruction, a return instruction, and a goto instruction is performed;

calculating ones of the plurality of run-time metrics based on data in the run-time stack;

storing ones of the plurality of run-time metrics in a run-time data structure associated with the plurality of user defined regions.

4. The method according to claim 1, wherein step (a) includes representing each of the plurality of user defined regions by one of a plurality of starting addresses and one of a plurality of ending addresses.

5. The method according to claim 4, wherein step (b) includes setting the plurality of range break points by:

comparing a first value of a program counter before a current instruction is executed to each of the plurality of starting addresses and to each of the plurality of ending addresses, and comparing a second value of the program counter after the current instruction had been executed to each of the plurality of starting addresses and to each of the plurality of ending addresses.

6. A method of analyzing performance of a program, executing in a computer system, based on a plurality of run-time metrics, the method comprising the steps of:

(a) providing a plurality of user defined regions of the program;

(b) partitioning the program into a plurality of working regions by dividing ones of the plurality of user defined regions that are overlapping into ones of the plurality of working regions;

(c) marking a working region of the plurality of working regions as interesting if the working region is contained in one of the plurality of user defined regions and marking the working region as uninteresting otherwise;

(d) setting the plurality of range break points, while the program is executing, each corresponding with exiting at least one of the plurality of working regions marked interesting;

(e) updating the plurality of run-time metrics during execution of the program whenever one of the plurality of range break points is set; and (f) reporting the plurality of run-time metrics to a user.

7. The method according to claim 6, wherein step (a) includes representing each of the plurality of working regions by one of a plurality of starting addresses and one of a plurality of ending addresses.

8. The method according to claim 7, wherein step (d) includes setting the plurality of range break points by:

comparing a first value of a program counter before a current instruction is executed to each of the plurality of starting addresses and to each of the plurality of ending addresses, and comparing a second value of the program counter after the current instruction had been executed to each of the plurality of starting addresses and to each of the plurality of ending addresses.

9. The method according to claim 6, wherein step (e) further comprises the steps of:

modifying data in a run-time stack whenever one of the group consisting of a call instruction, a return instruction, and a goto instruction is performed; calculating ones of the plurality of run-time metrics based on data in the run-time stack;

storing ones of the plurality of run-time metrics in a run-time data structure associated with the plurality of user defined regions.

10. The method according to claim 6, wherein the plurality of run-time metrics include an inclusive cycle count, an exclusive cycle count, and an execution count.

11. A system for analyzing performance of a program, executing in a computer system, based on a plurality of run-time metrics, comprising:

an input interface for acquiring a plurality of user defined regions of the program, each user defined region including a starting address and an ending address;

a range break point handler for setting a plurality of range break points, while the program is executing, each associated with at least one of the plurality of user defined regions comprised of:

a starting address register for storing the starting address of one of the plurality of user defined regions, an ending address register for storing the ending address of one of the plurality of user defined regions, and a control program for tracking a current user defined region of the plurality of user defined regions of the program by controlling the starting address register and the ending address register;

a plurality of data structures for storing and updating the plurality of run-time metrics during execution of the program whenever one of the plurality of range break points is set; and an output interface for reporting the plurality of run-time metrics to a user.

12. A system for analyzing performance of a program, executing in a computer system, as recited in claim 11, wherein the plurality of data structures includes a run-time stack and a run-time data structure.

13. A system for analyzing performance of a program, executing in a computer system, based on a plurality of run-time metrics, comprising:

an input interface for acquiring a plurality of user defined regions of the program, each user defined region including a starting address and an ending address;

partitioning means for partitioning the program into a plurality of working regions by dividing ones of the plurality of user defined regions that are overlapping into ones of the plurality of working regions;

marking means for marking a working region of the plurality of working regions as interesting if the working region is contained in one of the plurality of user defined regions and marking the working region as uninteresting otherwise;

a range break point handler for setting a plurality of range break points, while the program is executing, each corresponding with exiting at least one of the plurality of working regions marked interesting comprised of:

a starting address register for storing the starting address of one of the plurality of working regions, an ending address register for storing the ending address of one of the plurality of working regions, and a control program for tracking a current working region of the plurality of working regions of the program by controlling the starting address register and the ending address register;

a plurality of data structures for storing and updating the plurality of run-time metrics during execution of the program whenever one of the plurality of range break points is set; and an output interface device for reporting the plurality of run-time metrics to a user.

14. A system for analyzing performance of a program, executing in a computer system, as recited in claim 13, wherein the plurality of data structures includes a run-time stack and a run-time data structure.

* * * * *